United States Patent [19]

Aono

[11] 4,368,610
[45] Jan. 18, 1983

[54] SERRATED BLADE FOR A MOWING MACHINE

[76] Inventor: Toshio Aono, 2185-2, Fukui, Miki-shi, Hyogo-ken, Japan

[21] Appl. No.: 341,693

[22] Filed: Jan. 22, 1982

Related U.S. Application Data

[63] Continuation of Ser. No. 172,849, Jul. 28, 1980, abandoned.

[51] Int. Cl.³ ............................................. A01D 55/18
[52] U.S. Cl. ........................................ 56/295; 30/347
[58] Field of Search .................... 56/295; 30/276, 206, 30/347

[56] References Cited

U.S. PATENT DOCUMENTS

| | | | |
|---|---|---|---|
| 2,645,010 | 7/1953 | Holmes | 30/206 |
| 2,860,477 | 11/1958 | Chambliss | 56/295 |
| 3,336,737 | 8/1967 | Belfiore | 56/295 |
| 3,346,955 | 10/1967 | Beneke | 30/276 |
| 4,250,622 | 2/1981 | Houle | 56/295 |

*Primary Examiner*—Jay N. Eskovitz
*Attorney, Agent, or Firm*—Wenderoth, Lind & Ponack

[57] ABSTRACT

A serrated blade to be mounted on a mowing machine has a plurality of fingers arranged at regular intervals along the circumference of an imaginary circle and a plurality of sawteeth are provided between adjacent fingers. The sharp-pointed ends of the sawteeth define points of a substantially circular arc which has a smaller radius of curvature than the imaginary circle and is eccentric thereto so that each of the fingers is radially recessed on one side thereof.

2 Claims, 8 Drawing Figures

SERRATED BLADE FOR A MOWING MACHINE

The present application is a continuation of Ser. No. 172,849, filed July 28, 1980 and now abandoned.

The present invention relates to a serrated blade for a mowing machine.

When using a serrated blade for mowing often times the sawteeth thereof become blunt or break off as soon as they contact a hard object such as a pebble during the mowing operation. Therefore, when mowing with a serrated blade, one is compelled to take utmost care so as to prevent the sawteeth thereof from contacting hard objects. Because of this apprehension, sufficient efficiency is not obtained when using a serrated blade in a mowing operation.

It is an object of the present invention to provide a serrated blade which obviates the above-described drawback.

According to the present invention, there is provided a serrated blade which is mounted on a mowing machine and has a plurality of fingers arranged at regular intervals along the circumference of an imaginary circle and a plurality of sawteeth provided between the adjacent fingers. The sharp-pointed ends of the sawteeth form a substantially circular arc which has a smaller radius of curvature than the imaginary circle and is eccentric thereto so that each of the fingers has a beveled shoulder on one side.

BRIEF DESCRIPTION OF THE DRAWING

With the above-mentioned object in view; the present invention will become apparent from the following detailed description, and will be more clearly understood in connection with the accompanying drawings, in which:

Referring now to FIG. 1, a serrated blade 1 in accordance with the present invention is made of a plain disc-shaped sheet steel and provided with a plurality of fingers 4, which are arranged at regular intervals along the circumference of an imaginary circle 5. Each finger 4 has a circumferential edge 6 which is coterminous with the circumference of the circle 5.

Figure 1:
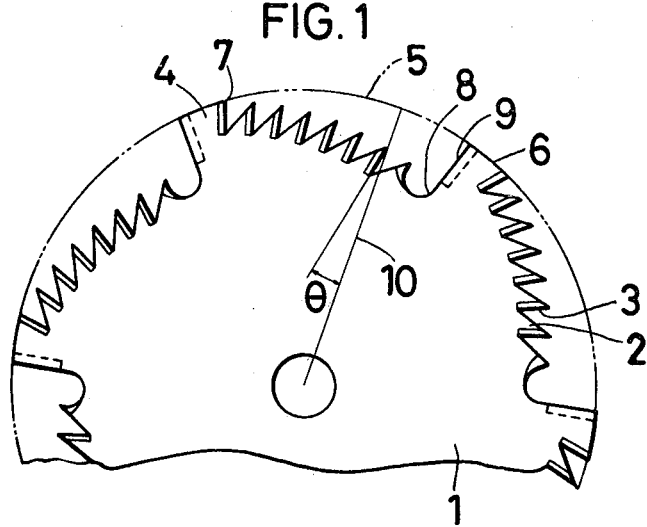
FIG. 1 is a top view of the first embodiment according to the present invention.

A plurality of sawteeth 2 are provided between adjacent fingers 4 in such a manner that sharp-pointed ends of the sawteeth 2 define points along a substantially circular arc. Each circular arc is eccentric to the circle 5 by an angle of $\theta$, so that each circular arc extends from a cusp 7 defining one end of the finger 4, to the beveled edge 8, defining the other end of the finger 4.

Each sawtooth 2 is provided with a cutting edge 3, which faces an opposed cutting edge 9 provided on the beveled edge 8 of the finger 4. Each cutting edge 3 is substantially perpendicular to a tangent line of the circular arc defined by points of the sharp-pointed ends of the sawtooth 2. Consequently, each cutting edge 3 advances forward by an angle of $\theta$, the angle each cutting edge 3 makes with a radius 10 of the circle 5.

Figure 3:
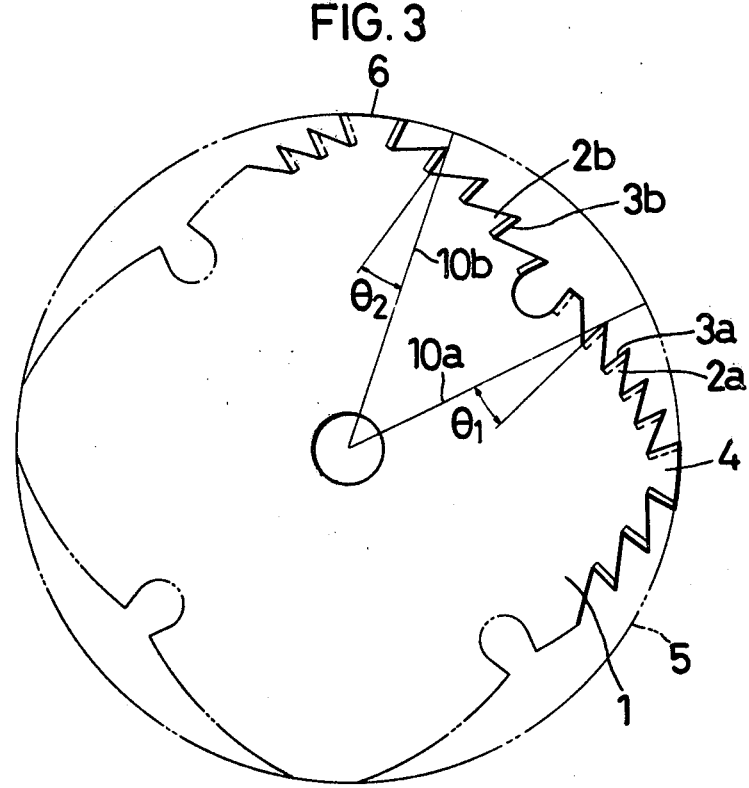
FIG. 3 is a top view of the second embodiment according to the present invention.
Figure 4:
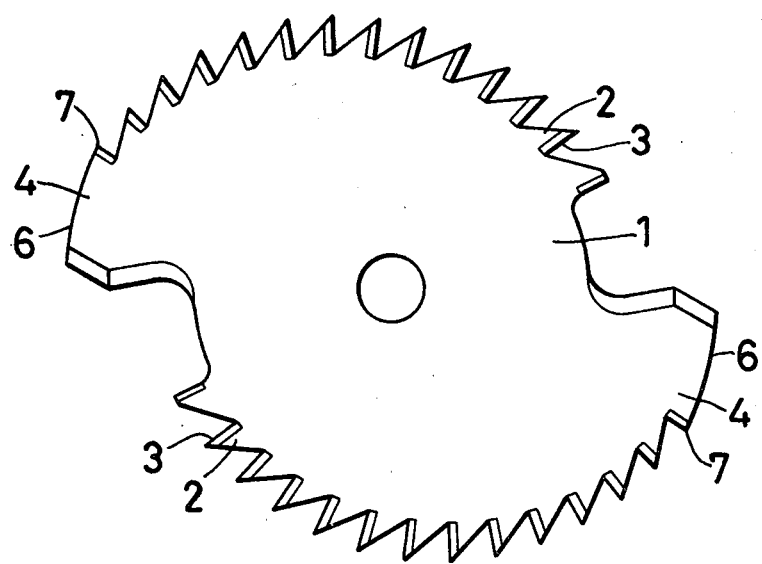
FIGS. 4 to 8 are respectively top views of the third to seventh embodiments according to the present invention.
Figure 5:
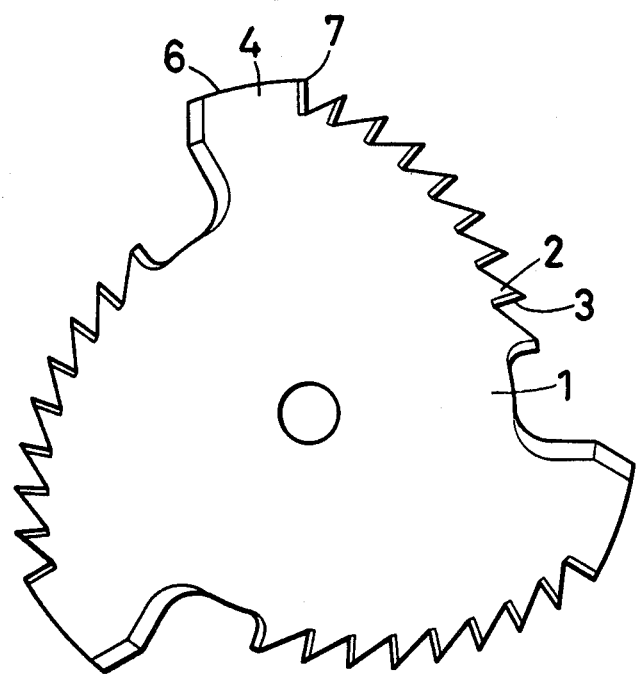
Figure 6:
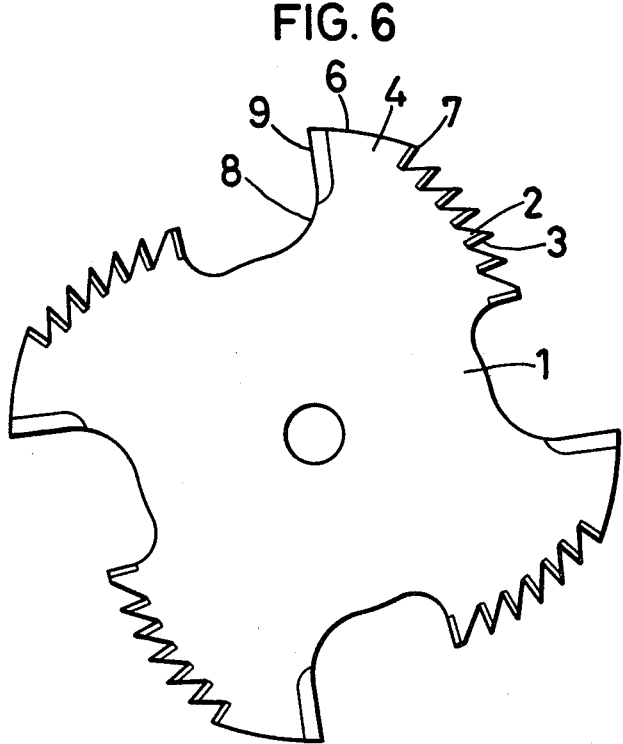
Figure 7:
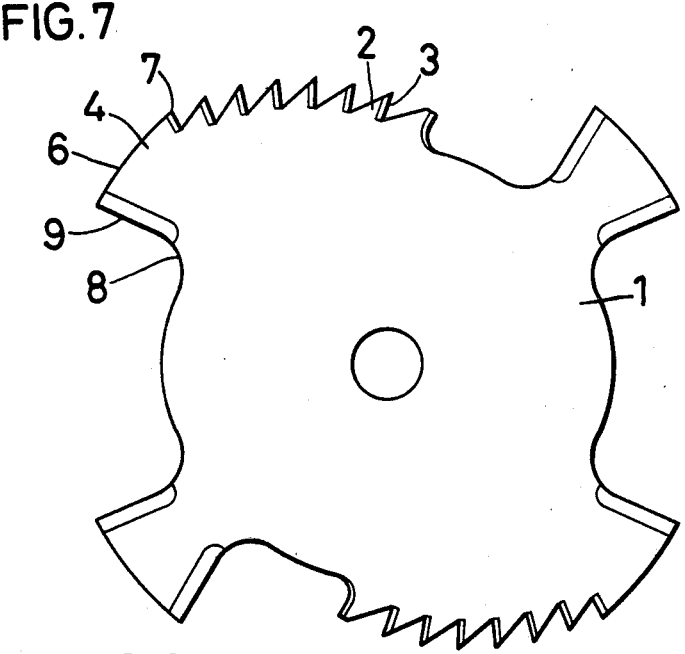
Figure 8:
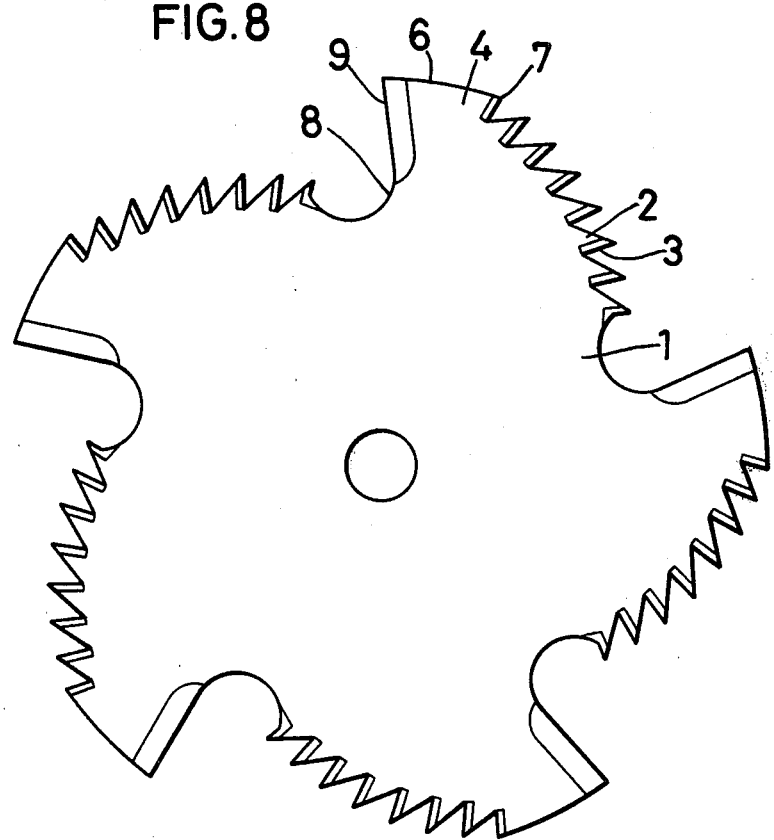

Referring now to FIG. 3, showing the second embodiment, a serrated blade 1 in accordance with the present invention is provided with a plurality of sawteeth 2a and 2b between adjacent fingers 4 in such a manner that the sharp-pointed ends of the sawteeth 2a and 2b define points along two respective circular areas, which have smaller radii of curvature than the circle 5 and are eccentric thereto so that both of the two circular arcs fall within the outer periphery of the circle 5. Each sawtooth 2a or 2b is provided with a respectively cutting edge 3a or 3b in such a manner that the cutting edges 3a provided on the sawteeth 2a defining points along one circular arc face the cutting edges 3b provided on the sawteeth 2b defining points along the other circular arc. Each cutting edge 3a and 3b is substantially perpendicular to a tangent line drawn with respect to each respective circular arc. Consequently, each cutting edge 3a advances forward by an angle of $\theta_1$, the angle each cutting edge 3a makes with a radius 10a of the circle 5, and each cutting edge 3b sweeps forward by an angle of $\theta_2$, the angle each cutting edge 3b makes with a radius 10b of the circle 5.

While the serrated blades shown in FIGS. 1, 2, 4, 5, 6, 7 and 8 are to be rotated in the clockwise direction during a mowing operation, the serrated blade shown in FIG. 3 can be rotated in either direction.

In operation, the serrated blade 1 is fixed to the tip of the rotary shaft of a mowing machine. The serrated blade 1 begins to rotate when the mowing machine is switched on. During the mowing operation, most of the hard things such as pebbles are bumped off by the circumferential edges 6 and hardly come in touch with the sawteeth 2. When the serrated blade 1 touches a hard thing sticking fast to the ground, it produces a high-pitched sound or emits sparks, at the signal of which the mowing operation has only to be suspended so that the sawteeth 2 may be protected from becoming blunt or damaged.

Figure 2:
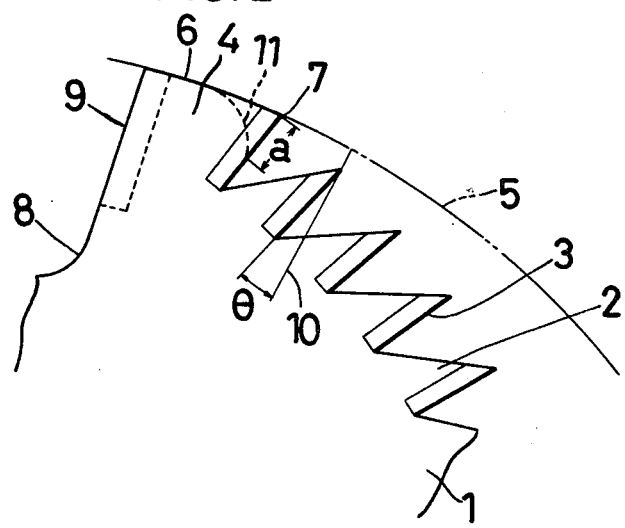
FIG. 2 is an enlarged top view of the embodiment as shown in FIG. 1.

Mowing machines which are in general use at present have a speed of revolution of 80 to 150 r.p.s., which is equivalent to 60 to 110 m/s in terms of the peripheral velocity of the serrated blade 1. On the other hand, the serrated blade 1 is usually moved from side to side or back and forth at a speed of 2 to 4 m/s. A hard thing such as a pebble comes into the circle 5 in a direction reverse to the direction of the resultant velocity which is the sum of the above-mentioned two velocities. Because of the fact that the diametrical component of this resultant velocity is incomparably smaller than the tangential component, the diametrical distance by which a hard thing can come into the circle 5 is generally as short as 1.5 to 4 mm, depending upon the diameter of the circle 5, the number of fingers 4, and the length of the circumferential edge 6. The diametrical distance by which a hard thing can come into the circle 5, which is designated by the letter a in FIG. 2, is equivalent to the radial distance of the damaged area of the sawtooth and such damage may be sustained by each finger 4 during the mowing operation. The depth a is inversely proportional to the number of fingers 4 provided on the serrated blade.

The damage sustained by each finger 4 was observed in mowing experiments made with the serrated blade 1 having six fingers 4 and six sawteeth 2 between each of the adjacent fingers 4. The damage resulted in a rounding of corner of the crusp 7 of each finger 4 as shown by a dotted line 11 in FIG. 2. The depth a amounted to approximately 2 mm, 3.5 mm and 4 to 5 mm after, 1-, 3-, and 6-hour continuous operation, respectively. Thereafter, the depth a did not substantially increase, while the sawteeth 2 began to slightly wear probably by stuck to the grass near the roots.

Therefore serrated blade in accordance with the present invention remains sharp even after use over a long period of time. Its life is more than 20 times as long as that of the conventional serrated blades. This is because the sawteeth 2 are arranged recessed positions.

The grass is securely caught and cut by the cutting edges 3 because each cutting edge 3 substantially forms an angle of advancement of $\theta$ with the radius 10.

While I have disclosed several embodiments of the present invention, it is to be understood that they have been described by way of example only, various other modifications being obvious without departing from the scope of the present invention.

What I claim is:

1. A serrated blade for a mowing machine comprising:
   a disc-shaped rotatable cutting blade;
   said cutting blade having a plurality of fingers, each of said fingers having two substantially radial edges extending radially outward therefrom, said fingers being circumferentially spaced along an outer edge of said cutting blade and being arranged such that circumferential spaces are defined between any two opposing radial edges of adjacent fingers and the outer peripheral edges of said fingers lying on an imaginary circle which has a center that is coaxial with the axis of said cutting blade, the leading radial edge being a cutting edge and having the outer end inclined in the direction of rotation of said blade relative to the inner end;
   said cutting blade having a plurality of radially extending sawteeth, positioned in the circumferential spaces, each of said sawteeth positioned in a corresponding circumferential space having the outer peripheral edges thereof defining points of a corresponding imaginary substantially circular arc extending from said leading radial edge inwardly from said imaginary circle and which has a radius of curvature less than that of the corresponding imaginary circle and has a center eccentric to the center of the corresponding imaginary circle;
   each of said sawteeth having a leading sawtooth cutting edge defined by a radial edge thereof, the sawteeth cutting edges being positioned on corresponding radial edges of said sawteeth and each said sawtooth cutting edge extending in a radial direction that is substantially perpendicular to the direction of a line tangent to the corresponding imaginary substantially circular arc.

2. A serrated blade as claimed in claim 1, wherein each of said sawteeth has an opposite radial edge that opposes the radial edge that defines the respective said sawtooth cutting edge, said opposite radial edge radially extends at an angle with respect to and intersects the respective said sawtooth cutting edge at the outermost circumferential edge thereof and thereby defines an outermost pointed circumferential edge.

* * * * *